United States Patent [19]

Corbeil et al.

[11] 4,407,839

[45] Oct. 4, 1983

[54] DUSTING BLEND

[75] Inventors: Roger Corbeil, Montreal; Gobind Sadaranganey, Mississauga, both of Canada

[73] Assignee: Robin Hood Multifoods Inc., Ontario, Canada

[21] Appl. No.: 280,469

[22] Filed: Jul. 6, 1981

[51] Int. Cl.³ .......................... A21D 8/10; A21D 2/02
[52] U.S. Cl. .................................. 426/622; 426/653; 426/321; 426/335; 426/806
[58] Field of Search ............... 426/653, 609, 622, 806, 426/321, 335

[56] References Cited

U.S. PATENT DOCUMENTS

| | | | |
|---|---|---|---|
| 980,635 | 1/1911 | Herb | 426/622 |
| 1,306,333 | 6/1919 | Greville | 426/622 |
| 1,499,080 | 6/1924 | Short | 426/622 |
| 1,846,581 | 2/1932 | Boyes | 426/622 |
| 2,012,506 | 8/1935 | Griffith | 426/653 |
| 2,389,302 | 11/1945 | Evans | 426/622 |
| 2,949,365 | 8/1960 | Becker | 426/653 |
| 3,171,747 | 3/1965 | Kessinger | 426/653 |
| 3,317,323 | 5/1969 | Lawrence | 426/622 |
| 3,377,171 | 4/1969 | Ryan | 426/653 |

*Primary Examiner*—Jeanette M. Hunter
*Attorney, Agent, or Firm*—Le Blanc, Nolan, Shur & Nies

[57] ABSTRACT

This invention relates to an improved dusting blend and the use of such a blend in a baking process. The improvement resides in the addition of salt to the dusting blend to retard insect infestation while at the same time retaining good flowability characteristics. The dusting blend is applied to cooking or baking equipment, as a dusting powder, to prevent food or dough from sticking to the equipment. The dusting blend of this invention controls insect infestation far better than known dusting blends comprising flour or starch.

19 Claims, No Drawings

DUSTING BLEND

FIELD OF THE INVENTION

This invention relates to an improved dusting blend and the use of such a blend in a baking process. The improvement resides in the addition of salt to the dusting blend to retard insect infestation while at the same time retaining good flowability characteristics.

DESCRIPTION OF THE PRIOR ART

In the baking process, dusting flour is applied to dough at various stages so that the dough does not stick to equipment, hands or other matter. Further, use of dusting flour makes handling easy, smooth and convenient. If dusting flour is not applied, the dough is likely to tear and be damaged in normal handling or in machinery.

Traditionally, bakers have used as dusting powder the same flour that is used in the baking process because it is easily available, has good handling characteristics and serves the purpose of avoiding damage to the dough. Conventional flour when used as dusting flour is a good media for growth of pest and insect life. Unless strict sanitation and house keeping practices are followed accumulation of dusting flour in the corners and crevices of equipment such as sheeters, rollers and proofers will serve as a refuge for infestation growth.

In a small bake shop, dusting flour may be employed by taking a handful from the flour bag and spreading it. In most bakeries the dusting flour is mechanically spread for uniform and economical usage of flour. Flour is stored in a hopper from where it flows over a shaking screen with perforated holes or a type of dusting machine which has a shaker arm. The flow of flour from this machine is controlled by proper selection of screen mesh, speed of shaking and/or rotation of shaker arm.

Some bakers have used starch as a dusting flour in the belief that it does not support insect life as much as baking flour does. Other have tried starch because it is felt that it has good functional properties. However, common starches are not sufficiently mobile and consequently starch has a tendency towards bridging. Some speciality starches on the other hand flow too rapidly from the screens commonly used by bakers. Moreover, starch has not proven to be an effective retardant for insect life. As a result of the foregoing, the disadvantages of using ordinary flour and ordinary starch has been of great concern to bakers.

As mentioned earlier, one of the objections of using ordinary flour as a dusting powder is that it is a good media for growth of infestation. There are many substances which are available in the marketplace that can be used to retard insect growth but care must be exercised in selecting one that can be used for food manufacturing use. Most bakeries control their infestation by frequent cleaning and spraying of chemical substances. However, the dusting flour currently used gets collected in the corners of equipment and these corners are difficult to clean. Even periodic cleaning of equipment and spraying has not proved to be very effective in the corners and the collection of flour has encouraged growth of insect life.

SUMMARY OF THE INVENTION

A purpose of this invention therefore has been to provide a dusting powder which will not support growth of insect life or at least retard insect growth and at the same time have flowability characteristics of uniformity and suitable rate of flow.

A further purpose of this invention has been to provide a product which has good flowability characteristics for use in a bakery and be substantially free of any tendency towards sticking, bridging or caking and capable of being used with standard dusting equipment.

This invention relates to an improved dusting blend for application to baking and cooking equipment and material, to prevent dough from sticking to said equipment the improvement residing in said dusting blend comprising salt in a quantity sufficient to retard insect infestation while at the same time not adversely affecting fermentation during the baking process.

The invention further relates to a method of retarding insect infestation in an area used for cooking or baking which method comprises using the dusting blend of this invention as a dusting powder for cooking or baking equipment.

DESCRIPTION OF THE PREFERRED EMBODIMENTS

There were several experiments conducted to determine the level of salt which does not undesirably affect the baking process or taste. The reason for this is that it was found that salt retards the fermentation process, can inhibit the desired effect of avoiding stickiness and can result in a salty tast being imparted to the finished baked goods. Testing indicated that up to 20% by weight of salt was functional and that a level of up to 12% salt did not show any noticeable differences in taste on the baked produce and use of salt up to a level of 12% in the dusting process was not detrimental to the fermentation process.

In addition to mixing flour and salt to form the dusting powder, additional components can be added to enhance flowabiity or retard or inhibit the formation of mould. A component which may be added to the dusting powder of this invention to reduce stickiness and enhance flowability is starch. Starch can be used along with flour or salt or may even replace the flour such that a starch and salt mixture is used as a dusting powder. Suitable starches include corn starch or wheat starch. Suitable alternatives to starch could be rice flour.

A component which may be added to the dusting powder of the invention to inhibit mould formation is calcium or sodium propionate. Alternatives to these could be substances such as potassium sorbate, sodium diacetate, ascorbic acid and propionic acid.

The salt used in the dusting flour mix could be in almost any form although too coarse a salt could detract from good flowability characteristics. Fine salt at 325 mesh and flour salt of 60 mesh have been used with good results.

Dried flour is capable of working better in the dusting flour blend than undried flour because moisture in undried flour is absorbed by the salt resulting in more stickiness than if dried flour was used.

EXAMPLES RELATING TO FLOWABILITY CHARACTERISTICS

It is known that flowability characteristics depend upon type of product, moisture content, particle size and chemical properties particularly related to water holding and fat absorption. Flowability can be measured in terms of viscosity, mobility indexes and various other empirical means. A purpose of this invention is to provide a product that will flow uniformly through screens commonly used by bakers irrespective of other physical characteristics. It was decided to use an actual screen as the test media. A screen with an opening of 1/64th of an inch and a shaker arm rotating at 60 shakes per minute was chosen and installed in the lab to measure the rate of flow. A test model was set up and tried with flours actually used in the trade and by a comparison of results, establishing that a product which has a flow rate of 220-300 g per minute through the test model is the one that would be most suitable for use in bakeries as far as rate of flow is concerned.

EXAMPLE 1

Dusting blends were made up in the lab. These were made by blending flour, corn starch, sodium propionate and salt. Salt was used at 6%, 9% and 12% levels (all parts by weight).

These 3 mixtures were used to evaluate effect of salt on the baking process.

Bread dough was made using standard procedures and after mixing, dough was divided into 3 equal portions.

One portion was made up by using a dusting flour blend containing 6% salt, the second portion by using dusting flour blend containing 9% salt and the third portion by using dusting flour blend containing 12% salt.

Very liberal amounts of dusting flour were used at the following stages in the baking process:
 (a) after scaling out of the mixer
 (b) after dividing and rounding
 (c) at moulding
 (d) on pans at proofing The breads made with the 3 above dusting flour blends were evaluated by an expert panel of 3 judges. The result of the tests indicated that 6 and 9% salt levels in the dusting blend did not show a substantial effect on the baking process or in the taste of the bread produced. It was observed that with 12% salt in the dusting blend, doughs were a little sticky and one of the judges noticed a little salty taste in the bread made with 12% salt in the dusting blend.

EXAMPLE 2

Regular Keynote TM flour (bakery patent flour) was used as a control for determining flowability characteristics. A regular bakery sifter with the following dimensions was used as a test model.

| Dimension | 15" × 4½" |
|---|---|
| Screen Size | 13¾" × 1¼" |
| Mesh Opening | 1/64" |
| Shaker Arm Speed | 60 shakes per minute |

2000 g of Keynote TM flour was put in the test model and the shaker arm started. Keynote TM flour (bakery patent flour) was allowed to flow. The flour was collected for 5 minutes to determine the rate of flow.

Several tests were done and a record of the amount of flour collected in 5 minutes was noted. Flour collected in 5 minutes varied from 1277 g to 1335 g or 255 g to 267 g per minute.

Field test experience indicated that flour with a flow rate significantly different from Keynote TM will not be preferred. Therefore it was established that a preferred flow rate target for the dusting blend of this invention, as measured by the test equipment, to be between 220-300 g per minute.

EXAMPLE 3

Larger scale batches were made to establish if the lab tests were confirmed by field tests regarding flowability. At the same time these batches were subjected to infestation studies. Keynote flour was used as control for both flowability and infestation studies. Two batches were made up with the only difference being the type of flour.

| Control | Batch 1 | | Batch 2 | |
|---|---|---|---|---|
| Keynote Flour 100% | Flour A (Dried) | 91.75 | Flour B (undried) | 91.75 |
| | Starch | 3.00 | Starch | 3.00 |
| | Salt | 5.00 | Salt | 5.00 |
| | Sodium Propionate | 0.25 | Sodium Propionate | 0.25 |

| | Control | Batch 1 | Batch 2 |
|---|---|---|---|
| Rate of Flow in 5 minutes | 1350 g | 1255 g | 1025 g |
| | 1365 g | 1160 g | 1000 g |
| | 1350 g | 1125 g | 1025 g |
| | 1320 g | 1100 g | 1020 g |
| Average per min. | 269 g | 232 g | 203 g |

These batches were put through field tests in a bakery. Observations indicated that Batch No. 1 performed well, had a uniform flow rate and had desirable rates of flow for dusting. Batch No. 2 flow rate was considered to be a little on the low side and Batch No. 1 was preferred. These field tests further confirmed that for good dusting flour, the flowability rate as measured by our test model should preferably be in the range of 220-300 g per minute.

The Effect of Salt on Retarding Insect Infestation in Dusting Blend

Having determined preferred flowability characteristics, tests were then conducted to examine the effect of salt and flour mixtures on retarding insect infestation in dusting flour. Different levels of flour salt were studied at various dosage levels (2, 4, 5, 6, 8, and 10 percent) in the dusting blends for their effectiveness in retarding the growth of the common insect pest, the confused flour beetle—*Tribolium confusum*. Under optimal environmental conditions, after seven weeks the artificially innoculated samples showed that population levels decreased by more than 50% at the 8 percent salt level. After 14 weeks the remaining insect level was approaching zero.

Dusting blends were prepared both in the laboratory and in the plant containing flour, corn starch, calcium propionate, and different levels (2, 4, 6, 8, and 10 percent) of salt. Tests were carried out innoculating both dried and undried flours. There was no significant difference between the two types as far as supporting insect life. That is to say the moisture level in the dried flour was not reduced to the extent that it affected the metabolic or reproductive abilities of the insects. Tests were conducted utilizing flour salt (60 mesh) and fine salt (325 mesh). As shown in the results a greater reduction in the number of insects occurred utilizing the fine salt in as much as the dispersibility factor was greater.

The initial population of insects was secured from the Research Station, Agriculture Canada, London, Ontario. Eggs, larva, and young adults (1 month old) of the Tribolium species were used to conduct these tests.

Subsequent culturing, sub-culturing, transferring, etc was performed at Robin Hood Multifoods Inc. The confused flour beetle was chosen for this experimental work as it is a general feeder on farinaceous foods and is undoubtedly the worst insect pest as regards prepared cereal foods. It is commonly found in flour mills, warehouses, and bakeries and tends to infiltrate parts of equipment and machinery. The insects were reared on a medium containing whole wheat flour and brewer's yeast in a climatically controlled environment at 25° C. where sufficient quantities of air and moisture were prevalent. Sub-culturing was done every two to three months onto fresh media.

Both larva and young adults were artificially innoculated into dusting blends containing various levels of salt and enumerated at varying intervals (7, 8 and 14 weeks).

Table 1 representing a first experiment showed that a dusting flour blend with 10 percent salt present not only prevented the growth of insects but dehydrated them to the extent that a total kill was evident. In this case the control sample showed more than a 6-fold increase in the larva population (25 to 166), whereas the adult population remained relatively stable at 60 insects. The next experiment was designed to establish the threshold level of salt required to retard insect multiplication.

Table 2 shows the effect of salt on insect life at 2 percent increments from a level of 2 percent to 12 percent (by weight). From this table we can see the 8 percent salt level has a marked effect on the multiplication of the Tribolium species. After seven weeks the larva population also decreased (from 30 to 10) although it began to increase after that seven week period. This increase is not significant in that no additional salt was added whereas conditions in the bake shop would necessitate a daily application of salt such that the overall salt concentration over time would increase above 8 percent.

Table 3 shows that larva and adult populations at both 5 and 8 percent levels of salt were killed off. Neither flour salt (60 mesh) or fine salt (325 mesh) as a complete medium would support insect life. Calcium propionate, another component in the dusting flour blend would not support insect growth, whereas corn starch would support the growth of Tribolium species as shown by the increase in larva from 60 to more than 100 and adult level being marginally higher.

It will be understood that while in the foregoing specification, embodiments of the invention have been described in detail, these details are not limiting and changes may be made in these details, by those skilled in the art, without departing from the spirit of the invention, especially as defined in the following claims.

TABLE 1

|  | Larva Population at T × 0 | Live Larva Population at T × 8 wks | Flour Beetle Population at T × 0 | Live Flour Beetle Population at T × 8 wks | Dead Flour Beetle Population at T × 8 wks |
|---|---|---|---|---|---|
| I. Dusting Blend 10% salt undried flour - prepared in the laboratory | 25 | 0 | 60 | 0 | 66 |
| II. Dusting Blend 10% salt dried flour - prepared in the laboratory | 25 | 0 | 60 | 0 | 63 |
| III. Dusting Blend 10% salt dried flour - Plant | 15 | 0 | 15 | 3 | 18 |
| IV. Undried Flour - Control | 15 | 166 | 60 | 60 | 7 |

TABLE 2

| Blend | DUSTING BLEND - RESULTS FOR INFESTATION INHIBITION | | | | | | | | |
|---|---|---|---|---|---|---|---|---|---|
|  | 383-1 | 383-2 | 383-3 | 383-4 | 383-5 | 383-6 | 383-7 | 383-8 | 383-9 |
| Flour | 1000 g | 997.5 g | 987.5 g | 977.5 g | 957.5 g | 937.5 g | 917.5 g | 897.5 g | 877.5 g |
| Calcium Propionate | 0 | 2.5 g | 2.5 g | 2.5 g | 2.5 g | 2.5 g | 2.5 g | 2.5 g | 2.5 g |
| Salt | 0 | 0 | 10.0 g | 20.0 g | 40.0 g | 60.0 g | 80.0 g | 100.0 g | 120.0 g |
| Total | 1000 g | 1000 g | 1000 g | 1000 g | 1000 g | 1000 g | 1000 g | 1000 g | 1000 g |
| Larva Population at T × 0 | 30 | 30 | 30 | 30 | 30 | 30 | 30 | 30 | 30 |
| Live Larva Pop. At T × 7 wks | 58 | 60 | 35 | 32 | 26 | 54 | 10 | 20 | 15 |
| T × 4 wks | >1000 | >2000 | >2000 | >1000 | >1000 | >800 | 80 | 150 | 51 |
| Live Flour Beetle Population at T × 0 | 60 | 60 | 60 | 60 | 60 | 60 | 60 | 60 | 60 |
| Live Flour Beetle Population at T × 7 wks | 65 | 54 | 60 | 77 | 64 | 40 | 26 | 28 | 21 |
| T × 14 wks | 61 | >100 | >100 | 43 | 30 | 80 | 3 | 6 | 3 |
| Dead Flour Beetle Population at T × 7 wks | 14 | 15 | 8 | 4 | 10 | 20 | 19 | 48 | 52 |
| T × 14 wks | 18 | 19 | 13 | 38 | 44 | 35 | 52 | 71 | 79 |

TABLE 3

| | Larva Pop. at T × 0 | Live Larva Population at T × 8 wks | Flour Beetle Population at T × 0 | Live Flour Beetle Pop. at T × 8 wks | Dead Flour Beetle Population at T × 8 wks |
|---|---|---|---|---|---|
| 1. Dusting Blend (8% salt) | 60 | 0 | 60 | 0 | 104 |
| 2. Dusting Blend (5% salt) | 60 | 0 | 60 | 0 | 96 |
| 3. Dusting Blend (6.5% salt) | 60 | 0 | 60 | 4 | 92 |
| 4. Flour Batch 5773 (control) | 60 | >1000 | 60 | 106 | 6 |
| 5. Flour Batch 5774 (control) | 60 | >1000 | 60 | 98 | 8 |
| 6. Corn starch | 60 | >100 | 60 | 64 | 22 |
| 7. Flour Salt (60 mesh) | 60 | 0 | 60 | 0 | 101 |
| 8. Salt (325 mesh) | 60 | 0 | 60 | 0 | 60 |
| 9. Calcium Propionate | 60 | 0 | 60 | 0 | 60 |

What we claim as our invention is:

1. An improved dusting blend for application to baking and cooking equipment and material, to prevent dough from sticking to said equipment, said dusting blend consisting essentially of a base material of flour or starch, and from 5% to 20% salt by weight sufficient to retard insect infestation while at the same time not adversely affecting fermentation of the dough.

2. The dusting blend of claim 1 wherein salt is present in an amount of from 5% to 12% by weight.

3. The dusting blend of claim 2 wherein the base material is dried flour.

4. The dusting blend of claim 2, further including calcium propionate to retard mould formation.

5. The dusting blend of claim 2 wherein said salt is of such a size that the rate of flow of said dusting blend is substantially the same as bakery flour.

6. The dusting blend of claim 5 wherein said salt is flour salt of a size of 60 mesh.

7. The dusting blend of claim 5 wherein said salt is fine salt of a size of 325 mesh.

8. The dusting blend of claim 2 consisting essentially of flour and 8% salt by weight.

9. The dusting blend of claim 6 consisting essentially of flour, cornstarch and 8% salt by weight.

10. A method of preparing the improved dusting blend of claim 1, 2 or 9, comprising the step of mixing said salt together with the remaining components of said dusting blend.

11. In a method of preventing dough from sticking to baking and cooking equipment and material by the use of a dusting blend, the improvement comprising using as said dusting blend a composition consisting essentially of a base material of flour or starch and from 2 to 20% by weight of salt, whereby insect infestation is retarded while not adversely affecting fermentation of the dough.

12. The method of claim 11 wherein salt is present in an amount of from 5% to 12% by weight.

13. The method of claim 12 wherein the base material is dried flour.

14. The method of claim 12 wherein said dusting blend further includes calcium propionate to retard mould formation.

15. The method of claim 12 wherein said salt is of such a size that the rate of flow of said dusting blend is substantially the same as bakery flour.

16. The method of claim 15 wherein said salt is flour salt of a size of 60 mesh.

17. The method of claim 15 wherein said salt is fine salt of a size of 325 mesh.

18. The method of claim 12 wherein said dusting blend consists essentially of flour and 8% salt by weight.

19. The method of claim 16 wherein said dusting blend consists essentially of flour, cornstarch and 8% salt by weight.

* * * * *